No. 718,574. PATENTED JAN. 13, 1903.
H. M. McCALL.
STARTING VALVE FOR EXPLOSIVE ENGINES.
APPLICATION FILED FEB. 6, 1902.
NO MODEL. 2 SHEETS—SHEET 1.
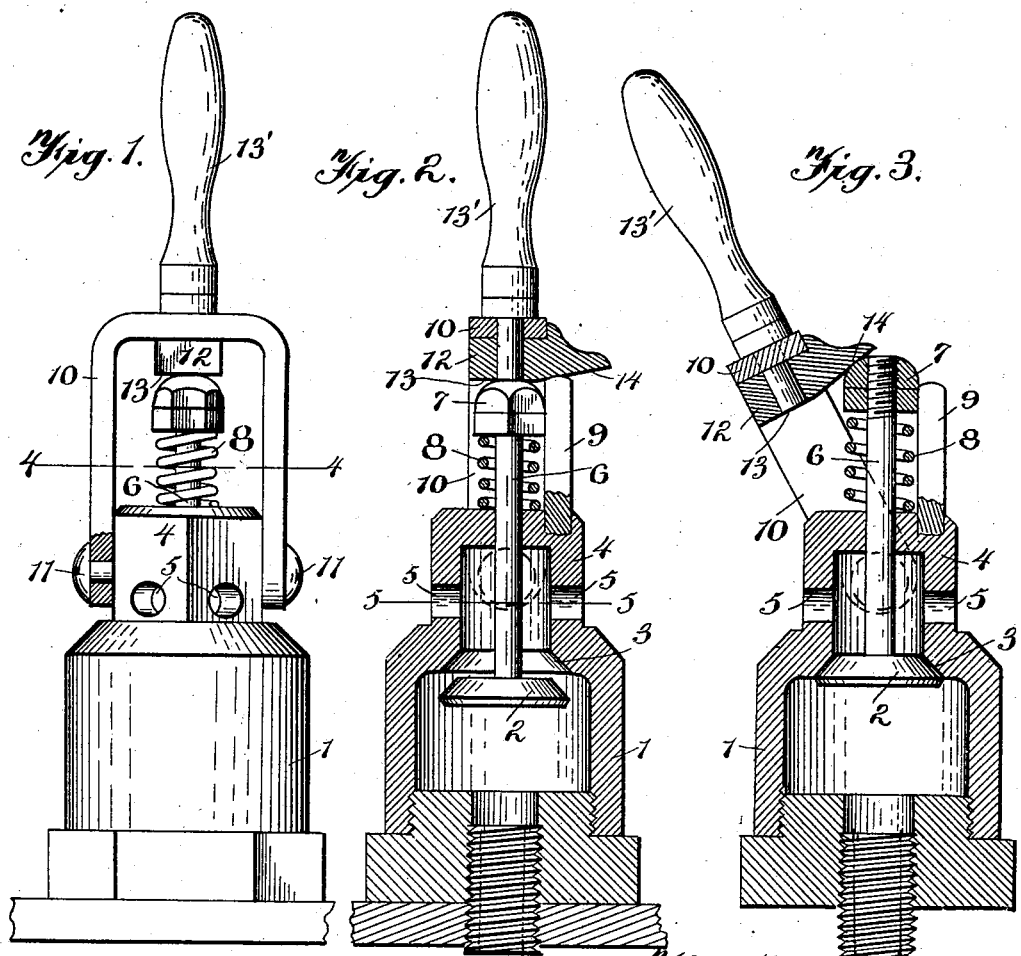
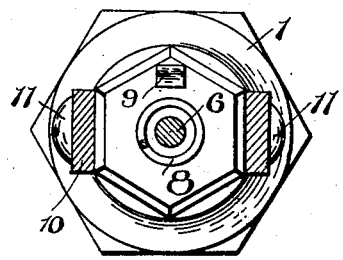
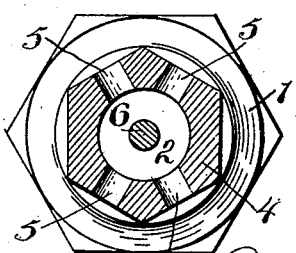

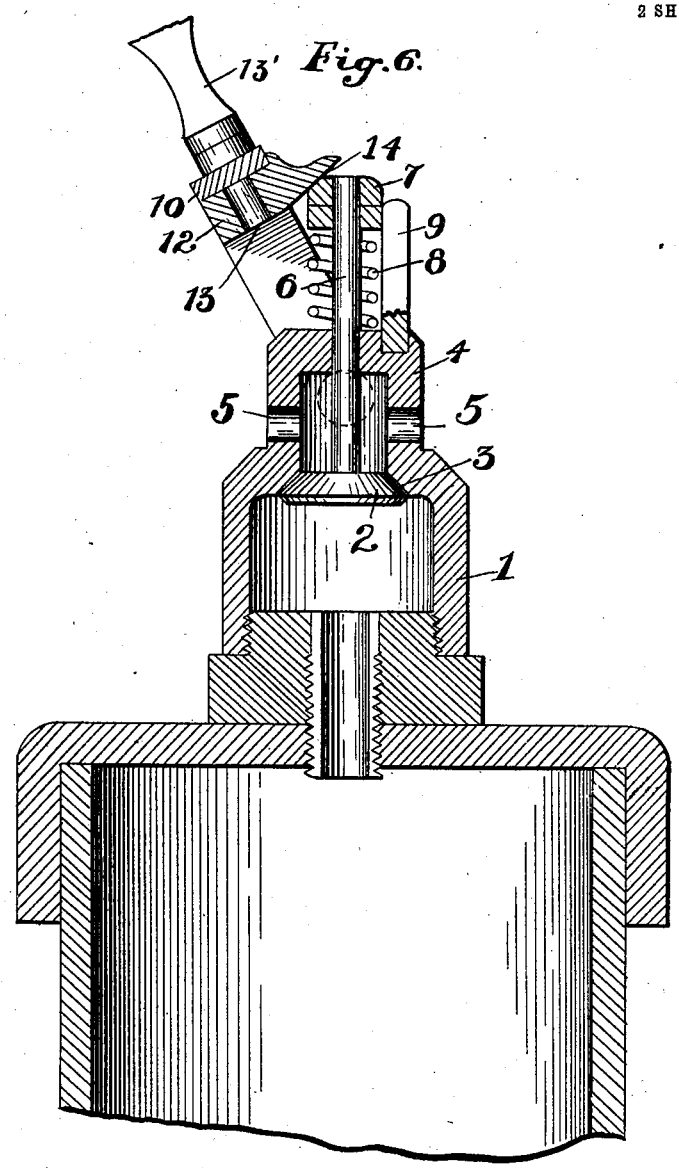

UNITED STATES PATENT OFFICE.

HARRY M. McCALL, OF PITTSBURG, PENNSYLVANIA, ASSIGNOR TO PITTSBURG GAS ENGINE COMPANY, OF PITTSBURG, PENNSYLVANIA.

STARTING-VALVE FOR EXPLOSIVE-ENGINES.

SPECIFICATION forming part of Letters Patent No. 718,574, dated January 13, 1903.

Application filed February 6, 1902. Serial No. 92,806. (No model.)

*To all whom it may concern:*

Be it known that I, HARRY M. McCALL, a citizen of the United States, residing at Pittsburg, in the county of Allegheny, State of Pennsylvania, have invented certain new and useful Improvements in Starting-Valves for Explosive-Engines; and I do hereby declare the following to be a full, clear, and exact description of the same, reference being had to the accompanying drawings, forming a part of this specification.

My invention has relation to starting-valves for explosive-engines; and it consists in the novel construction and arrangement of its parts, as hereinafter described.

The valve is especially adapted to be used on air and gas engines to afford a handy means for opening a port into the cylinder when the engine is started.

The object of my invention is to provide a means for opening and closing a valve without necessitating the operator to bring his hand in contact with the stem of the valve. As a rule these valves are located on the cylinder end, and as they are not protected by water-jackets or any other cooling means they necessarily become very hot and frequently the operator burns himself in attempting to open the valve at the starting of the engine.

The invention is an opening device applied to a valve of ordinary construction and consisting of a yoke made in the form of a lever which is fulcrumed at one end to the valve-casing and is provided with a block adapted to engage the valve-stem and to depress the same, thus opening the valve and overcoming the tension of the coil-spring, which normally holds the valve in a closed position. A reinforcing-post is provided, which is located on the valve-casing and acts as a guide for the valve-stem in a manner as will be hereinafter described.

In the accompanying drawings, Figure 1 is a side elevation of the valve with the opening device located therein. Fig. 2 is a transverse sectional view of the valve, showing the opening device depressing the valve. Fig. 3 is a transverse sectional view of a valve, showing the position of the opening device when the valve is closed. Fig. 4 is a horizontal sectional view of the valve cut on line 4 4 of Fig. 1. Fig. 5 is a horizontal sectional view of the valve cut on line 5 5 of Fig. 2. Fig. 6 is a transverse sectional view of the upper end of an engine-cylinder, showing a valve located thereon.

The valve-casing 1 is secured by any suitable means to the cylinder, as shown in Fig. 6. The said casing is provided with an ordinary valve 2, which is adapted to come against the ordinary seat 3. On top of the casing 1 is located a dome 4, said dome having in its sides a number of ports 5. The valve-stem 6 passes perpendicularly through the center of the top of the dome 4 and is provided at its upper end with a pair of jam-nuts 7, which engage suitable threads cut on the upper end of the said stem 6. The coil-spring 8 is interposed between the lower jam-nut 7 and the top of the dome 4. The tension of the said spring 8 has a tendency to maintain the valve-stem 6 and the valve 2 in their upper positions, as shown in Fig. 3. The post 9 is located on top of the dome 4, the lower end of said post being driven in a suitable aperture in the top of said dome, as shown in Fig. 2, the side of said post bearing lightly against the edges of the jam-nuts 7 and forms a guide for the same and prevents the said nuts from unscrewing. The lever 10 is bifurcated at its lower end, the said bifurcations being fulcrumed at the points 11 to the sides of the dome 4 in a manner as shown in Fig. 1, the said bifurcations of the said lever 10 forming a yoke, to the under side of the middle of which is attached a block 12. The upper portion of the lever 10 terminates in the handle 13'. The block 12 consists of a body portion having a surface 13, which is adapted to bear perpendicularly against the stem 6 when the lever 10 is in a position as shown in Fig. 2, thus holding the said stem 6 and its attachments in a depressed position. One side of said body portion of the block 12 is provided with a lug 14, the under surface of which is inclined at an angle to the surface 13, the object of which will be hereinafter explained. The top of the upper jam-nut 7 is rounded, as shown in Figs. 1, 2, and 3.

In operation the device works as follows: Before the starting of the engine the parts are in the position substantially as shown in Fig. 3. Before the operator begins to revolve the fly-wheel in order to start the engine he moves the lever 10 in the position as shown in Figs. 1 and 2. The inclined lower surface of the lug 14 passing up over the rounded upper surface of the upper jam-nut 7 forces the said nut down, which in turn depresses the valve-stem 6 and the valve 2, forcing the said valve away from the valve-seat 3, thus making it possible for air to enter through the ports 5 of the dome 4, past the valve-seat 3 into the interior of the casing 1, and from thence into the cylinder of the engine, thus preventing the creation of a vacuum in the cylinder of the engine and permitting the piston-head to retreat freely. Thus the fly-wheel can be revolved with ease and the engine can be started. After the engine is started the operator pulls the lever 10 into the position as shown in Fig. 3, when the valve 2 is closed against the seat 3, thus preventing the entrance of air through the ports 5 into the engine-cylinder and compelling the piston-head in its forward movements to draw in the gases or other explosive mixtures. In the perpendicular movement of the valve-stem 6 the post 9 bears slightly against the edges of the jam-nuts 7 and acts as a guide indirectly for the valve-stem, causing it to move in an exact perpendicular direction and preventing the said stem from binding in the aperture in the top of the dome 4, through which it passes. At the same time it causes the valve 2 to close in its proper relative position against the seat 3, and, furthermore, it prevents the jam-nuts 7 from unscrewing from the valve-stem 6. In case it should be necessary to regrind the valve 2 or the seat 3 the post 9 is placed in a vise, and by striking the top of the dome 4 with a hammer or other implement the valve-casing and its attachments may be separated from the said post 9. When this is done, oil or a suitable abrasive may be admitted against the valve-seat 3 and the valve 2 through the ports 5. Then by securing the stem 6 in the jaws of a vise the valve-casing 1 may be partially revolved in opposite directions by hand, and the seat 2 and the valve 3 can in this manner be reground. It will be observed that the length of the post 9 is such that its upper end is just above the surface 13 of the shunting mechanism 12 when the lever 10 is in the position as shown in Fig. 2. Thus the end of the said post 9, bearing against the lower inclined surface of the lug 14, acts as a stop for the said lever and prevents it from swinging entirely over the valve-stem 6 and its attachments.

Having described my invention, what I claim as new, and desire to secure by Letters Patent, is—

1. In combination with a reciprocating valve, a lever suitably fulcrumed, a block attached to said lever and adapted to engage the valve-stem and depress the same, a stop attached to the valve-casing and adapted to limit the movement of the lever in one direction, said stop also acting as a guide for the valve-stem.

2. In combination with a reciprocating valve having a projected stem, a nut located at the end of said stem and a spring interposed between said nut and the valve-casing, a lever suitably fulcrumed and having a block adapted to engage said nut and depress the same and the valve, a post erected on the valve-casing and adapted to act as a stop for the lever, as a guide for the valve-stem and as a means for preventing the revolving of the nut with relation to the valve-stem.

In testimony whereof I affix my signature in presence of two witnesses.

HARRY M. McCALL.

Witnesses:
ANSON S. TAYLOR,
J. THEO. RALPH.